June 18, 1935. J. W. SMITH 2,005,666
LOADING DEVICE
Filed June 5, 1933 2 Sheets-Sheet 1

INVENTOR
John W. Smith
BY
ATTORNEYS

June 18, 1935.　　　　J. W. SMITH　　　　2,005,666
LOADING DEVICE
Filed June 5, 1933　　　2 Sheets-Sheet 2
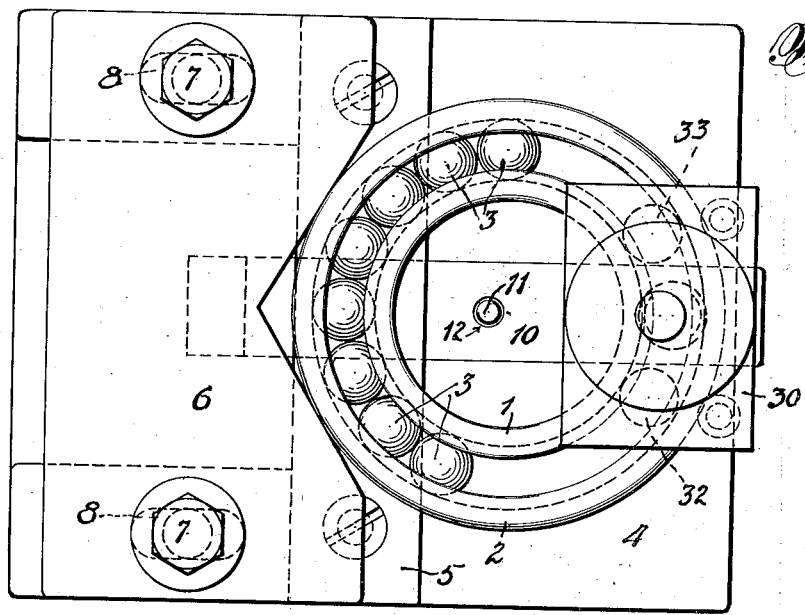
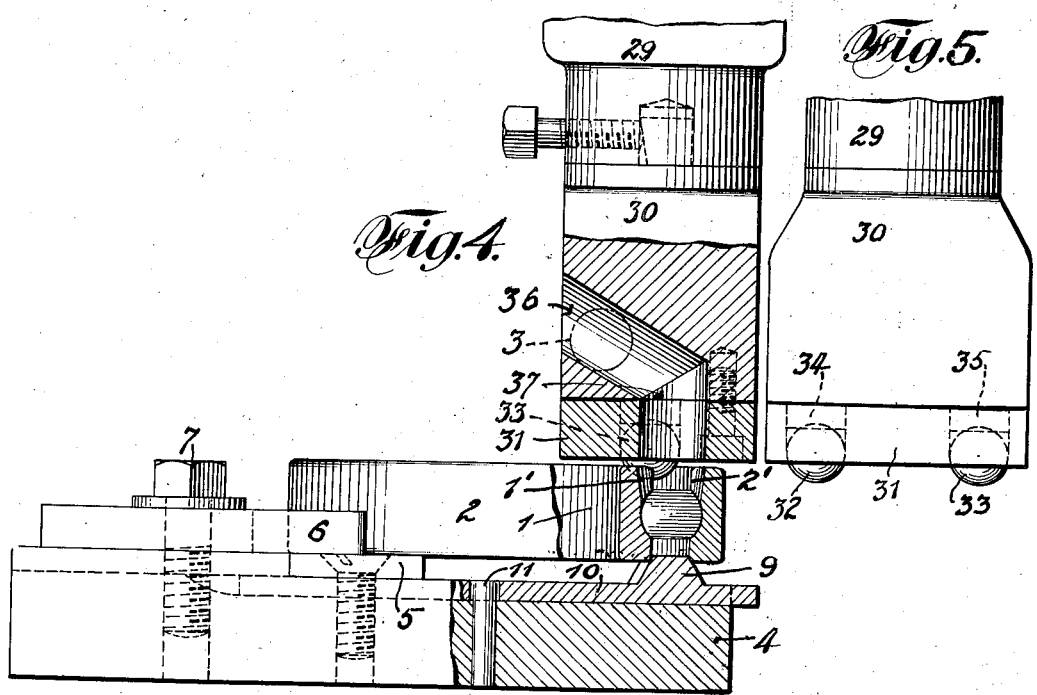
INVENTOR
John W. Smith
BY
Michael O Bechert
ATTORNEYS Patented June 18, 1935

2,005,666

UNITED STATES PATENT OFFICE 2,005,666

LOADING DEVICE

John W. Smith, New Britain, Conn., assignor to The Fafnir Bearing Company, New Britain, Conn., a corporation of Connecticut Application June 5, 1933, Serial No. 674,381

18 Claims. (Cl. 29—84)

This invention relates to certain new and useful improvements in loading devices for antifriction bearings.

In bearings such as ball bearings it is common to provide a so called filling notch in the side of one or both rings, neither one of which notches extends to the bottom of the raceway groove toward which it leads. When such a bearing has been filled with as many balls as may be readily admitted by eccentric displacement of said rings, any additional balls are inserted through said filling notches. Heretofore various devices, such as ordinary wedges, have been employed for temporarily spreading the rings in the zone of the filling notches, so that the balls last to be introduced may slip freely or be forced into the raceways. The bearing balls may serve as their own wedges to spread the rings, but the balls or rings are likely to be scratched or damaged, and for that reason, among others, some other wedge or spreading device is usually employed.

One object of my invention is to provide new and improved means for spreading bearing rings apart to permit introduction of additional balls.

It is another object of my invention to provide a novel spreading means, preferably in the form of a hardened steel ball, so mounted that its operative position may be shifted in its support, whereby a large number of spaced wedging points may be presented to the bearing rings as the device is successively operated to spread said rings.

Another object is to provide such a construction that, should a spreader device become damaged replacement may be effected at trifling expense and with practically no loss of time.

Other objects and advantages will be apparent to the mechanic skilled in the art from an examination of the accompanying drawings and a reading of the following description.

In the accompanying drawings I have shown two preferred forms of my new and improved bearing ring spreader or loading device.

Fig. 3 is a plan view of another form of spreader as it would appear in use;

Fig. 4 is a side elevation, partly in section, of the parts shown in Fig. 3;

Fig. 5 is a side elevation of one of the parts shown in Figs. 3 and 4, said elevation being taken at right angles to the elevation shown in Fig. 4.

Briefly stated, in the preferred form of the invention the bearing, comprising two bearing rings filled with the number of balls readily inserted by the eccentric displacement method, is supported on a table or platen and, if desired, at the zone of that part of the rings to be spread it may be supported upon wedge means carried by the bed or platen. If two filling notches are employed the filling notches are matched with each other and, in any event, the filling notch, if only one is employed, is arranged over or near the wedge device. At the side of the rings opposite the wedging device mentioned I employ a second wedging device, preferably in the form of a symmetrical element, such as a ball, to be forced between the two rings at the side of the filling notch or notches so as to spread the rings apart to such an extent that a bearing ball may be inserted through the filling notch into the raceways. The rings may be spread sufficiently to permit the bearing ball to drop in freely or they may be spread only to such an extent that only slight force (not enough to injure the balls or rings) may be required to force the bearing ball into the raceways. The second wedging element, such as a ball, may be mounted so as to be self-adjusting to different positions, whereby new wear surfaces will be provided and thus undue wear at any points of engagement with the rings will be avoided. Clearly other wedging means, preferably symmetrical about at least one axis, could be employed instead of the wedging balls. The wedging balls or similar devices are preferably mounted so as to be readily removable for replacement when required.

In the illustrative drawings 1—2 represents, respectively, the inner and outer bearing rings of a unit handling ball bearing. 1' represents a shallow filling notch at the side of the raceway in the inner ring 1. 2' represents a shallow filling notch at the side of the raceway in the outer ring 2. 3—3 represent that number of bearing balls which may be freely inserted into the raceways by merely eccentrically displacing the rings. When these balls have been introduced the rings 1—2 are brought into concentric relationship and so positioned that the notches 1'—2' face each other.

Figure 1:
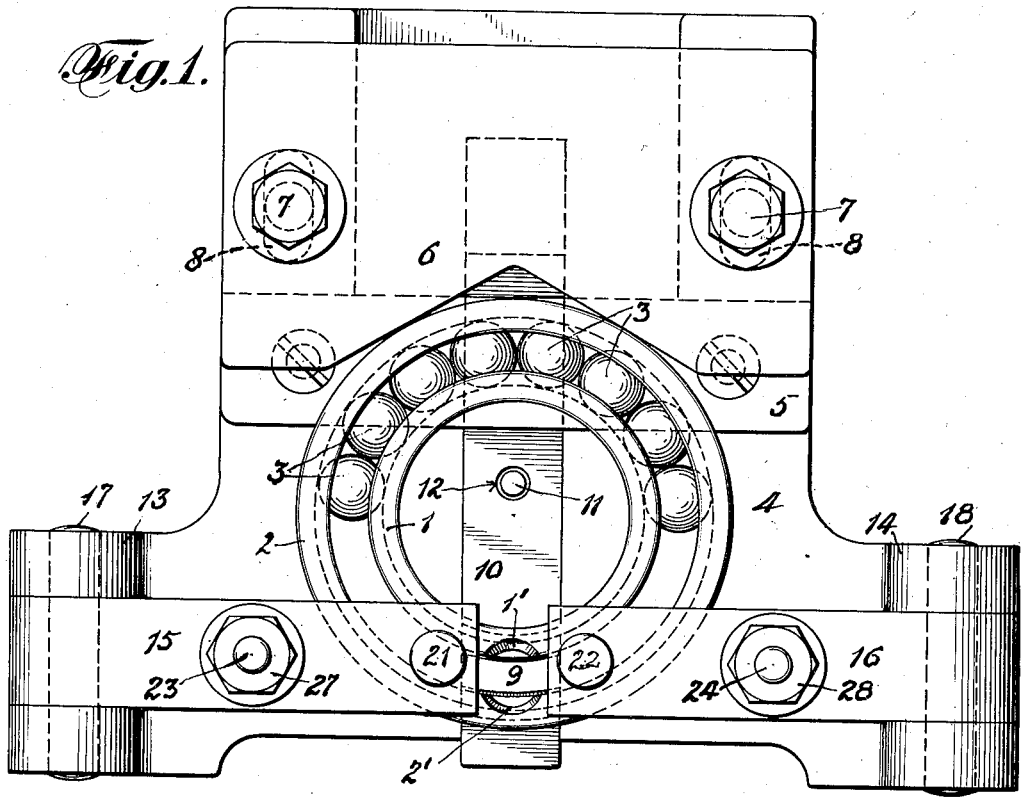
Fig. 1 is a plan view of one form of spreader as it would appear in use.
Figure 2:
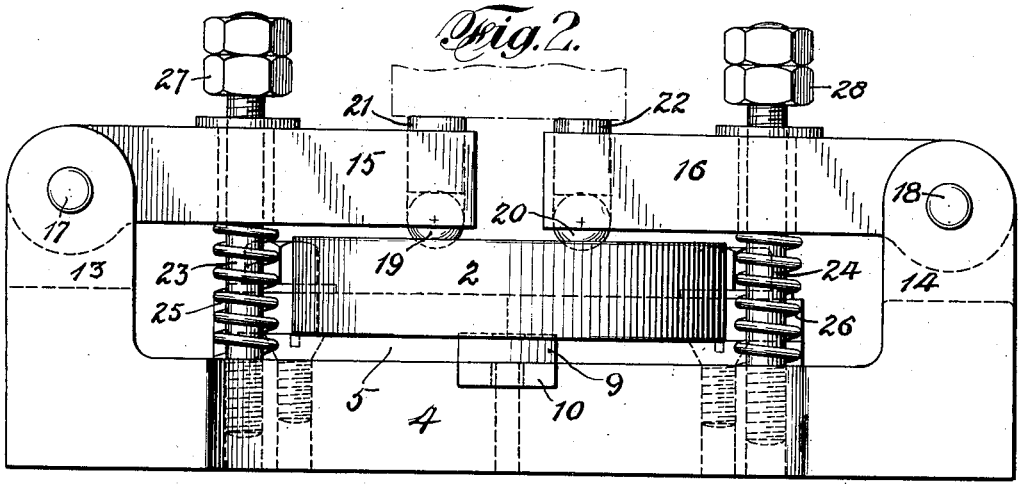
Fig. 2 is a front elevation thereof.

In Figs. 1 and 2 of the drawings, 4 represents a table which at its rear may have a supporting ledge or shelf 5. Back of the shelf is a back stop 6, the front edge of which is recessed to provide two diagonally opposed walls against which the outer bearing ring may rest when the parts are in position to receive the last few bearing balls. The back stop 6 may be clamped in place by screw bolts 7—7 which preferably pass through longitudinal slots 8—8 to permit the back stop to be adjusted to and fro. At the front of the table 5 is a wedge-like support 9 mounted on a plate 10 which extends rearwardly into a guide slot or passage in the table 4. 11 is a pin carried by the table and extending through an enlarged passage 12 in the plate 10 to permit the plate to have a sufficient range of movement to and fro whereby the wedge 9 may be self-adjusting. When a partially filled bearing such as shown is placed with its rear portion on the shelf 5 with the outer ring bearing against the back stop 6 and with the bearing balls 3 pushed to the rear, the front portion of the bearing will be supported by the wedge member 9 which may center itself between the rings 1—2 and keep them spaced. The upper extremity of the support is somewhat smaller than the space between the rings so that it can slightly enter said space. The supporting member 9 is also preferably curved to approximate the curve of the space between the rings. 13—14 are brackets extending upwardly from the table 4 and at opposite sides thereof. 15—16 are two independent arms arranged in line and constituting holders or carriers for the ring spreading devices. The rear ends of each of these arms are pivoted respectively at 17—18 on the brackets 13—14. The free end of each arm has a vertical passage contracted at its lower end to form sockets for the spreader devices. 19—20 are the spreader devices, preferably in the form of hard steel balls which are held in the bottom of said sockets but permitted to project partially therethrough as shown. Removably fitted within the passages above each of the spreader balls respectively, are plugs 21—22, the lower ends of which rest upon the spreader balls, while the upper ends may extend slightly above the upper surfaces of the arms 15—16. Any ordinary ram or plunger may be employed to crowd down upon the plugs 21—22 to in turn crowd down the spreader balls 19—20 with sufficient force to crowd the rings down on the support 9 and spread said rings in the zone of the filler notches 1'—2'. The position of such a ram is indicated in dotted outline in Fig. 2. 23—24 are rods extending upwardly from the table and freely through passages in the arms 15—16. These rods 23—24 may support expansion springs 25—26 respectively, said springs exerting an upward push on the free ends of arms 15—16 so as to normally hold the spreader elements 19—20 elevated to facilitate the easy insertion and removal of bearing rings. 27—28 represent nuts on the upper ends of the rods 23—24 which may be provided to limit the upward movement of the arms 15—16.

Assume a bearing has been partially filled with bearing balls as shown in Fig. 1. When so filled, it is placed above the table in the position shown in Fig. 1 and the bearing balls are pushed to the rear as shown. The arms 15—16 are then forced downwardly so as to bring the spreader balls 19—20 between the adjacent inner edges of the rings in the zone of the filler notch. This pressure causes the adjacent portions of the two rings to be crowded down on the spreader element 9 and be sprung apart in said zone so that one or more additional bearing balls may be freely passed through the notches and into the raceways of the rings. When the support 9 is wedge shaped, it coacts with the balls 19—20 in effecting the spreading of the rings in said zone since it is located directly under the filling notches in said rings. The free ends of the arms 15—16 are spaced apart sufficiently to provide ample room to permit bearing balls to be passed into said filler notches. When the rings have been thus filled with the desired number of additional bearing balls, downward pressure on the arms 15—16 is released, thus permitting the rings to resume their normal shape. As these filling or loading operations are repeated, it is apparent that there will be a serious tendency to wear or check the ring spreading devices 19—20, but inasmuch as these spreading devices may turn on their own axes and adjust themselves to numberless positions within their respective holder sockets, it follows that practically an infinite number of spreader points are provided on the surface of each of said spreader device so that wear and the danger of injury is practically negligible. If by any possibility one of my spreader devices should become injured, it can be quickly and easily removed from its holder and replaced by another without injury to the carrier or requiring the substitution of a new carrier.

Now, referring to the construction shown in Figs. 3 to 5. Those parts bearing the same reference numerals as used in Figs. 1 and 2 correspond therewith. 29 represents the lower end of a plunger, 30 is a carrier for the ring spreading devices 32—33, which carrier may be removably secured to the lower end of the plunger 29. The lower end of the carrier has a removable plate 31 which may be secured thereto by any suitable means such as screws. In plate 31 are two bores, both of which are contracted at their lower ends to form sockets for the spreader balls 32—33 and in which said balls may rotate. If necessary, filler pieces 34—35 may be located in said sockets above the spreader balls to act as a backing means therefor. Here, again, the balls 32—33 are preferably entirely free to rotate in their sockets as successive spreading operations occur so as to present new points of contact for the rings. 36 is a downwardly inclined guide passage in the body of the carrier which communicates with a vertical guide passage 37 in the carrier plate 31. These guide passages form a conduit larger than the bearing balls so that balls may be easily inserted into the carrier and cannot escape from being accurately and successively conveyed to the filling notches in the bearing rings.

In both forms of my invention the projection of the spreader elements is so comparatively slight that when they stand between the rings 1—2 they will not project into the path of the bearing balls when the latter stand in the raceways; hence, when the first additional bearing ball has been inserted into said races, it is not necessary to retract the spreader means, but said ball may be pushed freely to one side so as to allow the next additional ball to drop into place, and so on. In this respect the form shown in Figs. 3 to 5 is advantageous in that the desired number of additional bearing balls may be introduced into the conduit 36 at the outset and from which said balls will be fed successively into the bearing raceways in the manner described.

From the foregoing it will be seen that the spreading devices are features in common to both constructions herein shown. While I have only shown these self-adjusting rotatively displaceable spreading devices in the form of balls, it is obvious that they do not have to be strictly in that form so long as they may be rotated in their respective carriers whereby different spacer points may be presented to the work. For example, tapered spacer rollers could very well be substituted in place of the spacer balls shown, in which event the sockets would obviously be properly shaped to receive the rollers instead of balls. While spherical balls are for many reasons preferable as the spacing means, I do not wish to have my invention necessarily limited thereto. In other respects also my invention is capable of modification without departing from the spirit thereof or the scope of the following claims.

I claim:

1. In a loading device for a bearing comprising a pair of hardened bearing rings each having a grooved raceway at least one of which is provided with a filler groove, means to hold said rings in spaced relation, a spreader ball to engage directly and simultaneously each of said rings at a point at one side of and adjacent to said filler groove for temporarily spreading the rings in the location of said filler groove to permit a bearing ball to be passed through said filler groove and into the raceways of said rings, and means to apply force in a direction to cause the spreader ball to enter partially between said rings to spread them for the purpose described.

2. In a loading device for a bearing comprising a pair of bearing rings having grooved raceways, a filler notch in one of said rings, spreader balls to engage between said rings at spaced points on opposite sides of said filler notch for spreading the same apart in the location of said notch only, and means for loosely carrying and guiding said spreader balls, and means to apply force in a direction to cause the spreader ball to enter partially between said rings to spread them for the purpose described.

3. In a loading device for a bearing comprising a pair of bearing rings having raceways, a filler notch in one of said rings, axially movable spreader means to be forced between the rings at one side thereof and at opposite sides of said notch, and coacting spreader means to be forced between said rings at the opposite side thereof, said last mentioned spreader means being adjustable radially relatively to said bearing rings for positioning relatively thereto, and means to force said spreader means between said rings for the purpose described.

4. In a loading device for a bearing comprising a pair of bearing rings, carrier means, a pair of separate hardened spreader members independent of each other and loosely carried by said carrier means, and means for forcing said spreader members between the bearing rings to spread the same locally.

5. In a loading device for a bearing comprising a pair of bearing rings, a base for sustaining a bearing, an arm pivotally carried by said base and having a spreader part to be forced between the rings of the bearing, and means for forcing said spreader part between the rings for spreading the same.

6. In a loading device for a bearing comprising a pair of rings, a base to sustain a bearing, a carrier member movably secured to said base, a ball loosely carried by said carrier member and positioned thereby over the space between the rings, and means for forcing the ball between the rings to spread the same whereby another ball may be passed between the rings and into the raceways thereof, and means normally urging said carrier and ball away from the rings.

7. In a loading device for a bearing comprising a pair of rings each having a raceway groove and at least one of which has a loading notch therein, a base to sustain a bearing, means for positioning the bearing thereon, a spreader member connected to said base for movement relatively to said bearing rings whereby the same may be self-adjusting to project between the rings at one side of said bearing rings to spread the same, means carrying a pair of spreader members at spaced points on the opposite side of said bearing to engage between the rings on opposite sides of the loading notch, and means for urging said last mentioned spreader members into spreading engagement with said rings whereby a ball may be passed through said loading notch and into the raceways of said rings.

8. In a loading device for a unit handling bearing, a support for a pair of bearing rings partially filled with balls, means for spreading said rings apart at an unfilled portion to permit additional balls to be introduced comprising, a carrier movable toward and from said rings, a pair of self-adjusting ring spreading devices rotatably carried by said carrier and projecting therefrom to be entered into the space between said rings to force them apart adjacent its point of entry.

9. In a loading device for a unit handling bearing, a support for a pair of bearing rings partially filled with balls, means for spreading said rings apart at an unfilled portion to permit additional balls to be introduced comprising, a carrier movable toward and from said rings, a pair of self-adjusting ring spreading devices rotatably carried by said carrier and projecting therefrom to be entered into the space between said rings to force them apart adjacent its point of entry, and a second coacting ring spreading device on the opposite side of the bearing rings from the first mentioned spreading devices.

10. In a loading device for a unit handling bearing, a support for a pair of bearing rings partially filled with balls, means for spreading said rings apart to permit additional balls to be introduced comprising, a carrier movable toward and from said rings, a ring spreading device rotatably carried by said carrier and projecting therefrom to be entered into the space between said rings to force them apart adjacent its point of entry, and a downwardly directed conduit in said carrier leading to a point alongside of said ring spreader.

11. In a loading device for a unit handling bearing, a support for a pair of bearing rings partially filled with balls, means for spreading said rings apart to permit additional balls to be introduced into an unfilled portion comprising a carrier movable toward and from said rings, a pair of loosely mounted self-adjusting ring spreading devices carried by said carrier and projecting partially therefrom to be entered into the space between said rings to force them apart adjacent the point of entry.

12. In a loading device for a unit handling bearing, a support for a pair of bearing rings partially filled with bearing balls, means for spreading said rings apart to permit additional bearing balls to be introduced into an unfilled portion and comprising carrier means movable toward and from said rings, and having ball sockets, spreader balls mounted in said sockets and projecting partially therefrom to be entered into the space between said rings to force them apart adjacent the point of entry to permit additional bearing balls to be entered between said bearing rings.

13. In a loading device for a unit handling bearing, a support for a pair of bearing rings having grooved raceways partially filled with bearing balls, means for spreading said rings apart to permit additional bearing balls to be introduced into an unfilled portion, comprising a carrier movable toward and from said rings, and having a ball socket therein, a spreader ball in said socket and projecting partially therefrom and adapted to be forced partially between said rings in the unfilled region to spread the same in said location to facilitate the insertion of an additional bearing ball.

14. In a loading device for unit handling ball bearings, a support for a pair of bearing rings having grooved raceways partially filled with bearing balls, means to spread apart that portion of said rings unfilled with bearing balls comprising, carrier means movable toward and from said rings and having spaced sockets, removable spreader balls in said sockets the same projecting partially outside of said sockets to face the space between said rings, said carrier means having a passage to permit additional bearing balls to be fed through the space between the spreader balls, and means to move said carrier means and rings toward each other to spread the latter, for the purpose described.

15. A loading device for a bearing comprising a pair of bearing rings each having a raceway groove and at least one of which has a filling notch terminating short of the bottom of the raceway therein, said loading means comprising a wedging member adapted to enter between the rings at the side opposite said notch, and means at the opposite side of said rings and at one side of said notch, said means and wedging member being movable toward each other to crowd said rings apart in the region of said notch to facilitate the passing of a bearing ball through said notch and into the raceways of said rings.

16. Means for filling unit handling ball bearings composed of two concentric bearing rings with bearing balls therebetween in the raceways thereof, one of said rings having a filler notch leading from the side of one of said rings to a point near to but above the bottom of the raceway therein, said means comprising a wedging device arranged to enter the space between said rings on the side opposite said notch, and means engaging the notched side of the bearing at one side of said notch, with means to crowd the last mentioned means and said wedging device toward each other to spread the rings apart in the region of said notch to permit bearing balls to be passed with comparative freedom through said notch and into the raceways.

17. A loading device for unit handling ball bearings comprising a pair of bearing rings having complementary raceways with bearing balls therein, said device including means for supporting said rings on one side after said races have been partially filled with bearing balls, a spreader ball, and means to force said spreader ball partially between said rings in an unfilled section to temporarily spread the same locally to permit an additional bearing ball to be fully entered with comparative freedom into said raceways.

18. A loading device for unit handling ball bearings comprising a pair of bearing rings having complementary raceways with bearing balls therein, said device including means for supporting said rings on one side after said raceways have been partially filled with bearing balls, means comprising a punch member and a pair of spreader members carried thereby at spaced apart points thereon, said spreader members being of circular cross section, and means for forcing said spreader members partially between said rings in an unfilled section to temporarily spread the same locally to permit an additional bearing ball to be entered between said rings at a point between said spreader members.

JOHN W. SMITH.